United States Patent
Weiss

[11] 3,747,349
[45] July 24, 1973

[54] HYDROSTATIC TRANSMISSION
[75] Inventor: Heinz Weiss, Langenargen, Germany
[73] Assignee: Zahnradfabrik Friedrichshafen Aktiengesellschaft, Friedrichshafen, Germany
[22] Filed: Sept. 27, 1971
[21] Appl. No.: 183,890

[30] Foreign Application Priority Data
  Oct. 3, 1970  Germany.................. P 20 48 637.7

[52] U.S. Cl...................... 60/421, 60/487, 74/720, 91/505, 180/6.48, 60/485
[51] Int. Cl............................................ F16h 39/46
[58] Field of Search.................... 60/53 A, 420, 421, 60/428, 429, 437, 438, 492; 180/6.48, 66; 91/499, 505; 74/720, 730

[56] References Cited
UNITED STATES PATENTS
1,840,864   1/1932   Rayburn et al..................... 60/53 A
3,161,023  12/1964   Margolin et al. .................... 60/53 A
3,314,234   4/1967   Orshansky .......................... 60/53 A
3,430,438   3/1969   Weiss.................................. 60/53 A
3,465,616   9/1969   Schou ............................. 60/53 A X

*Primary Examiner*—Edgar W. Geoghegan
*Attorney*—Zalkind, Horne & Shuster

[57] ABSTRACT

The strokes of a pair of pump pistons are continuously varied by stroke control discs during rotation of a casing mounting the pump pistons as well as motor pistons hydraulically coupled thereto to form a hydrostatic power path superimposed on a mechanical power path established during rotation of the casing by the motor pistons reacting against inclined discs connected to output shafts. The inclination of the pump stroke control discs are independently controlled by a servo arrangement in response to various control influences.

9 Claims, 1 Drawing Figure

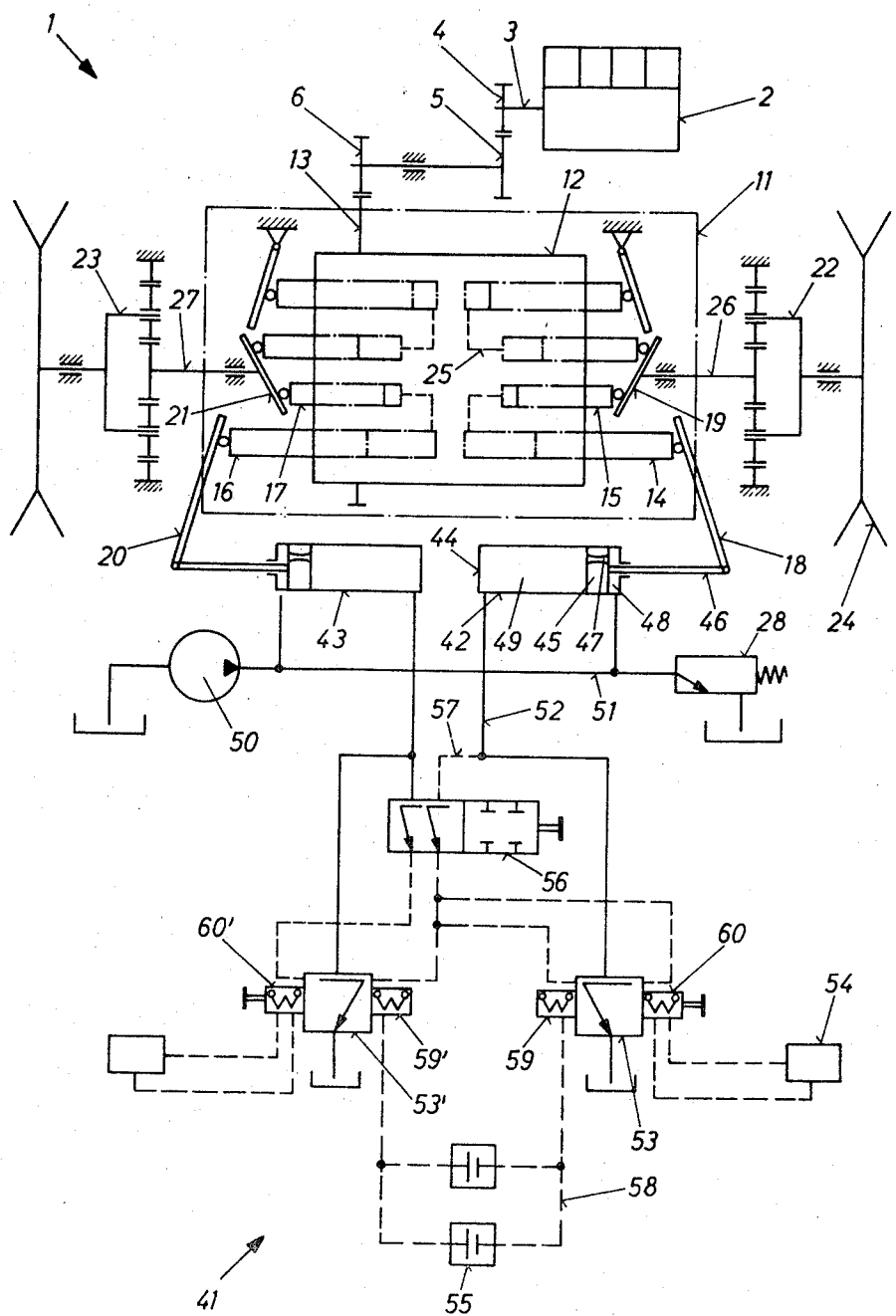

HYDROSTATIC TRANSMISSION

This invention relates to a variable, split power path type of hydrostatic transmission.

Power transmissions having plural power paths established by hydrostatic and mechanical drive units are well known. In one type of such a transmission, the outputs of the hydraulic and mechanical drive units are combined by a gear mechanism. Also, differential gears are required in order to obtain a steering-by-driving effect for the vehicle in which such transmissions are installed. Transmissions capable of so functioning without differential or power path combining, planetary gearing, have relied upon multiple hydraulic units. The constructional costs of the foregoing types of transmissions are considerable. Further axial thrust load wear on bearings in many instances and deterioration of complex control systems associated with the foregoing transmissions make operational reliability less than satisfactory.

It is therefore an object of the present invention to provide a hydrostatic transmission of the aforementioned type avoiding the disadvantages and high costs and yet obtain reliable drive of wheels in opposite directions under a continuously variable drive ratio mode of operation as well as a differential locking effect under selectively adjusted conditions.

In accordance with the present invention, a pair of fluid pump and motor units having inclined, stroke controlling discs or wobble plates, are mounted by a common casing for rotation about an axis extending through a pair of output shafts to which the discs associated with the motor unit are connected. The inclination of two stroke controlling discs associated with the pump unit may be independently and continuously varied by a servo control arrangement in accordance with desired operational control influences. The servo arrangement includes double acting pistons subjected on one side to the regulated output pressure of a pump and on the other side to the pressures in chambers from which fluid is controllably discharged and to which fluid is supplied from the pump source through flow restriction means.

A detailed description of the transmission is now presented with reference to the accompanying drawing.

The drawing illustrates schematically, as one embodiment of the invention, a combined hydrostatic-mechanical split power path transmission 1 for a wheeled or track laying vehicle. The power transmitting portion 11 of the transmission is drivingly connected to an engine 2 by a reduction gear train including a gear 4, connected to the engine shaft 3, in mesh with countershaft gear 5. The other countershaft gear 6 meshes with gear 13 fixed to a casing 12 rotatable about a common fixed frame axis extending through a pair of output shafts 26 and 27. The output shafts are respectively geared to vehicle propelling wheels 24 by planetary gear sets 22 and 23. A control system generally denoted by reference numeral 41 is associated with the power transmitting portion 11 for controlling operation thereof.

The power transmitting portion 11 includes two pair of symmetrically disposed hydrostatic units, each including a pair of fluid transmitter devices reciprocally mounted within pressure chambers formed in the rotatable casing 12 extending in parallel spaced relation to the axis through shafts 26 and 27 about which the casing is rotated. Radially outer pairs of pump pistons 14 and 16 respectively associated with each hydrostatic unit are arranged to reciprocate in response to rotation of the casing by engagement of the projecting ends of these pistons with rotationally fixed, stroke adjusting control discs 18 and 20 independently positioned at an incline to a plane perpendicular to the rotational axis of the casing 12. The pressure chambers associated with pistons 14 and 16 are in fluid communication through conduits 25 in the casing with pressure chambers associated with corresponding pairs of radially inner motor pistons 15 and 16 of the fluid transmitter device having their projecting ends in engagement with inclined drive discs or wobble plates 19 and 20 rotatable with the output shafts 26 and 27. In the embodiment illustrated, the inclination of discs 19 and 21 is fixed. It will, however, be appreciated that the disc inclination could be adjusted, if desired, by suitable adjusting mechanism.

It will be apparent that a hydrostatic power coupling is established by the closed fluid circuit between the pressure chambers associated with the pump and motor pistons depending on the inclinations of the pump stroke control discs 18 and 20. Pressurization of the fluid medium in the pressure chambers and conduits 25 will vary in magnitude with the strokes of pistons 14 and 16 dependent upon the inclinations of discs 18 and 20 and at a frequency dependent on engine speed to hydraulically transmit power to the output shafts through motor pistons 15 and 17. Further, a mechanical drive is established between the engine and the output shafts through the drive discs 19 and 21 in all instantaneous positions of the motor pistons 15 and 17. For example, with the control discs 18 and 20 positioned perpendicular to the rotational axis of casing 12, there will be zero piston stroke and no hydraulic power transmission so that the motor pistons 15 and 17 will be locked in axial positions in the casing 12 and will mechanically transmit power along one path to the output shafts at a drive ratio dependent upon the inclination of discs 19 and 21. Displacement of the control discs 18 and 20 in either direction from the zero stroke position will accordingly transmit power hydraulically along another power path that is superimposed on the mechanical power path aforementioned either additively or subtractively. The power output of the engine driving the casing 12 is therefore split between the hydraulic and mechanical power paths at ratios dependent on the inclinations of the control discs 18 and 20 to obtain drive ratios relative to the output shafts 26 and 27 in both forward and reverse directions.

The inclinations of the discs 18 and 20 are controlled by servo motors 42 and 43 of the control system 41. Each of these servo motors includes a double acting piston 45 operatively connected by its piston rod 46 to an associated control disc 18 or 20. Each piston 45 is displaced within its cylinder 44 by supply of a pressurized fluid medium in conduit 51 connected to chamber 48 on one side of the piston. Both servo motor cylinders 44 are simultaneously pressurized by pump 50 connected to the supply conduit 51. The pump may be driven by the vehicle engine 2 and its output pressure maintained at a predetermined level by means of pressure regulator valve 28. The servo pistons 45 are also acted upon by pressure of the fluid medium within chambers 49. The chambers 48 and 49 are in restricted fluid communication with each other through a flow restrictor 47 in the piston 45. Accordingly, the position assumed by the piston 45 will depend on the instantaneous difference between pressures in the chambers 48 and 49.

While the pressure in chamber 48 is controlled by the pump 50 and regulator valve 28, the pressure in chamber 49 depends on the pump pressure in chamber 48 and discharge of fluid medium through conduits 52 under control of pressure regulating valves 53 and 53'. These regulating valves are under the influences of signal pressure responsive control devices 60 and 60' respectively opposed by control devices 59 and 59' in order to obtain a preselected output speed. Power output could, of course, be controlled in accordance with other factors such as furrow depth for agricultural vehicles, or pressure developed in the conduits 25 of the hydrostatic drive aforementioned. Also, the regulating valves 53 and 53' could be operated manually to achieve different rotational directions at wheels 24 for steering purposes.

Speed control may be exercized by wheel speed sensing devices 54 and 54' connected to the control devices 60 and 60' as shown by dotted line in the drawing in order to counter-balance the influences of control devices 59 and 59' tending to establish a rated speed position for the servo motors 42 and 43 through the regulating valves 53 and 53'. The control devices 59 and 59' may be coupled to each other by a circuit 58 of an electromechanical or hydro-pneumatic type in order to obtain equalization in output speeds of the wheels.

Additional drive control signals may be introduced into the control system through regulating elements 55 in the circuit 58. Also, the individual control actions of the regulating valves 53 and 53' may be by-passed by a pilot valve 56 and line 57 connected to one of the discharge conduits 52 as shown by dotted line. The pilot valve 56 is interconnected with the other discharge conduit 52 and with the regulating valves 53 and 53' for this purpose as shown by dotted line. It is thereby possible to control the pump and motor piston devices in the casing 12 through the servo motors 42 and 43 so as to operate the transmission as a continuously adjustable locking differential.

I claim:

1. In a transmission through which power is split between fluid and mechanical power paths, a pair of driven members (26 and 27), rotatable mounting means (12), a pair of hydrostatic units carried by said mounting means and respectively connected to the driven members independently of each other, each of said hydrostatic units including a pair of fluid transmitter devices, common drive means (19 or 21) operatively connecting said pair of fluid transmitter devices to one of the driven members and adjusting means (18 or 20) operatively connected to one of said pair of fluid transmitter devices (14 – 15 or 16 – 17), and servo regulating means (42 and 43) connected to the adjusting means associated with each of the hydrostatic units.

2. The combination of claim 1 wherein each of said fluid transmitter devices includes motor and pump pistons reciprocated in response to rotation of the rotatable mounting means, said motor pistons being engageable with the common drive means while the pump pistons associated with said one of the pairs of fluid transmitter devices being engageable with the adjusting means for reciprocation controlled by the servo regulating means.

3. The combination of claim 2 wherein said driven members and mounting means are rotatable about a common axis.

4. The combination of claim 3, wherein said mounting means comprises a common casing within which the fluid transmitter devices are reciprocable in parallel spaced relation to the axis.

5. The combination of claim 4, wherein said servo means includes a cylinder, a double acting piston separating the cylinder into two pressure chambers, regulated pump means connected to one of the chambers for supply of pressurized medium thereto and flow restriction means interconnecting said chambers.

6. The combination of claim 5, including signal controlled regulating means connected to the other of the chambers for controlling discharge of the fluid medium therefrom to individually vary the inclination of the adjusting means engaged by the pump pistons associated with said one of the fluid transmitter devices.

7. The combination of claim 1, wherein said servo means includes a cylinder, a double acting piston, separating the cylinder into two pressure chambers, regulated pump means connected to one of the chambers for supply of pressurized medium thereto and flow restriction means interconnecting said chambers.

8. The combination of claim 7, including signal controlled regulating means connected to the other of the chambers for controlling discharge of the fluid medium therefrom.

9. The combination of claim 1, including signal controlled regulating means connected to the servo means for controlling discharge of fluid medium therefrom to individually vary the inclination of the adjusting means engaged by said one of the fluid transmitter devices.

* * * * *